3,779,958
METHOD OF PREPARING A PHENOL FORMAL-
DEHYDE AMINE MICROPOROUS SHEET
Katsumi Ohba, Kanagawa, Japan, assignor to
W. R. Grace & Co., Cambridge, Mass.
No Drawing. Filed July 15, 1971, Ser. No. 163,095
Int. Cl. C08g 9/00, 22/48; H01m 3/00
U.S. Cl. 260—2.5 F                          10 Claims

ABSTRACT OF THE DISCLOSURE

Microporous resinous sheets particularly useful as battery separators are prepared from phenol/formaldehyde/amine resinous pre-products.

---

This invention relates to a method of making microporous resinous sheet materials. More particularly, this invention concerns a method for preparing microporous sheets from phenol/formaldehyde resins, which sheets find particular utility as separators in electrical storage batteries.

Thin, microporous sheet materials prepared from, for example, resin impregnated cellulosic webs, or sintered or extracted plastic sheet materials, have been employed as separators in electric storage batteries, particularly sulfuric acid storage batteries. The sheet material prevents contact between the positive and negative plates of the battery yet its microporosity allows for the necessary passage of electrolyte.

In U.S. Patent No. 3,475,355 there is described a process for preparing a microporous sheet material which is ideally suited for use as a battery separator from a condensation product of phenol, resorcinol and formaldehyde. The condensed, uncured resin is diluted with water and solidified by adding an acid accelerator or curing agent, care being exercised to prevent the escape of water during the solidifying step. The water entrapped within the solidified resin is then removed leading to a finished microporous product. The obtainment of the finely-porous product is dependent upon the successful entrapment of water throughout the solidified resinous matrix. It was found that the incorporation of resorcinol initially in the condensation product avoided the undesirable formation of a resinous phase separate from an aqueous phase when the condensation product was diluted with water and the acid curing agent added.

In the present invention, a microporous sheet material ideally suited for use as a battery separator is prepared from a resinous phenol/formaldehyde/amine pre-product. The pre-product starting material is obtained by condensing an amine with an uncured phenol/formaldehyde condensation resin. The resinous pre-product so obtained is diluted with water and an acidic accelerator or curing agent is added to solidify the resinous pre-product. The solidification is effected under conditions which do not allow the water to escape. After removal of the water entrapped within the solidified resin, the resin is fully cured to form the final microporous product.

The present invention is based upon the discovery that by incorporating the amine in the phenol/formaldehyde condensation product prior to curing, the undesirable separation of resin and aqueous phases upon addition of water and curing agent can be avoided.

The uncured phenol/formaldehyde condensation resins employed to prepare the pre-product starting material are well known in the art. These uncured or not-fully cured resinous materials are prepared using conventional base-catalyzed condensation reaction techniques wherein an excess of formaldehyde reactant is employed. Such resins often are neutralized by the manufacturer and made commercially available in the form of aqueous solutions.

The amines employed to prepare the phenol/formaldehyde/amine pre-product have at least one pendant amino-hydrogen,

in their structural formula. Exemplary of the amines suitable for use in the present invention are aliphatic primary and secondary amines, especially lower aliphatic primary and secondary amines containing up to about 7 carbon atoms such as methylamine, ethylamine, n-propylamine, isopropylamine, allylamine, butylamine, n-amylamine, cyclohexylamine, etc., primary and secondary alkanolamine, especially alkanolamines containing from about 2 to 7 carbon atoms, such as monoethanolamine, monoisopropanolamine, diethanolamine, 2-amino-1-butanol, 2-amino-2-methyl-1-propanol, 2-amino-2-methyl-1-3 propanediol, 2-amino-2 ethyl-1-3 propanediol, 3-propanediol, etc.; aromatic primary and secondary amines such as aniline, phenylene diamine, toluene diamine, etc., as well as mixtures thereof.

Primary and secondary alkanolamines are preferred for use in preparing the phenol/formaldehyde/amine starting material of the present invention. Primary alkanolamines are especially preferred since it has been found that such amines are most effective in preventing separation of resinous and aqueous phases during the preparation of the microporous sheet of the invention. The use of a combination of a primary alkanolamine such as monoethanolamine and a secondary alkanolamine such as diethanolamine in the process of the invention has been found to be particularly advantageous since the use of such combination prevents the formation of a large number of small waves (undulations) in the finished sheet.

The condensation reaction between the amine and the uncured phenol/formaldehyde resin is carried out by mixing the amine with preferably an aqueous solution of the phenol/formaldehyde resin and heating. The temperature to which the mixture is heated is not critical. The condensation reaction appears to proceed faster with increasing temperature. Good results have been obtained by heating the reactants at 70° C. for 40 minutes and also at 80° C. for 20 minutes.

The amount of amine reacted with the phenol/formaldehyde resin can vary according to the amount of water that is desirable to be entrapped in the solidified sheet. Increasing the amount of amine in the resinous pre-product increases the amount of water that can be added in the dilution step without phase separation. Too little an amount of entrapped water results in insufficient porosity. Excessive amounts of entrapped water leads to a solidified sheet that is too soft for further practical handling. In general, microporous sheets can be obtained according to the process of the invention employing a phenol/formaldehyde/amine resinous pre-product containing from about 1 to about 50, preferably from about 5 to 25, percent by weight of amine based upon the phenol and formaldehyde (solids) and thereafter diluting the resinous pre-product with up to about 70 weight percent water based on the resinous pre-product.

Curing to solidify the diluted phenol/formaldehyde/amine resinous pre-product is accomplished by adding a sufficient amount of an acid accelerator or curing agent. Suitable curing agents for this purpose include hydrochloric acid, sulfonic acid, nitric acid, phosphorous acid, phenol sulfonic acid, p-toluene sulfonic acid, etc., and mixtures thereof.

Preferably a small amount of an inhibitor such as acetone, ethylene glycol glycerine, ethylene glycol-monomethyl-ether or methanol is added prior to, along with, or immediately after the curing agent to maintain the diluted resin in a pourable state.

After the addition of the curing agent, or curing agent and inhibitor, the diluted resinous mixture is placed in a mold or cast on a flat surface, and covered to prevent evaporation of the volatiles in the mixture during the solidification step. The solidification is advantageously hastened by heating, for example, to about 50 to 100° C. After solidifying the resinous matrix, the entrapped material, mostly water, is removed and the microporous sheet advanced to its final, cured state by heating to a temperature of about 100 to 250° C.

The entrapped material may be removed by extraction with a suitable solvent. Preferably, the removal is accomplished by heating the filled, solidified sheet to a temperature at which the entrapped material evaporates out. The latter method of removal is advantageous since all volatile materials entrapped, such as water and volatile acid curing agents, are removed in a single step. Removal by heating to evaporation temperature is also advantageous since such a removal step and the final heat-curing step can be combined in a single operation.

A washing step with water may be employed prior to, or subsequent to the removal step. Such washing removes nonvolatile, or not easily volatilized materials, such as nonvolatile and curing agents, e.g., sulfonic acid, phosphoric acid or nitric acid, as well as water-soluble salts, the presence of which may be undesirable when the microporous sheet is to be used as a battery separator.

Inert fillers and/or fibers can be employed in the microporous sheets of the invention, preferably by incorporation in the liquid resinous pre-product prior to the solidification step. Alternatively, the filler and/or fiber can be placed at the bottom of the mold or laid on the casting surface and the resinous pre-product placed thereover. As examples of suitable fillers, mention may be made of those materials which are insoluble in sulfuric acid such as silicon hydroxide, aluminum oxide, carbon black, coal dust, mica, kaolin, asbestos, diatomaceous earth, vermiculite, calcium silicate, aluminum polysilicate, wood flour, glass particles and barium sulfate. The use of such materials does not impair the function of the microporous sheet as a battery separator. Fibers composed of, for example, glass, cellulose, asbestos, Dacron, rayon, and acrylics improve the mechanical stability of the microporous sheet. The aforementioned fillers are generally employed in an amount up to about 200 weight percent, and the fibers in an amount up to about 25 weight percent, based on the weight of the resin.

When the intended use of the sheet is as a battery separator, it will usually be desirable to provide ribs on one or both sides of the sheet. This may be easily accomplished by using an appropriately shaped mold during the solidification step. Alternatively, ribs may be applied to the finished microporous sheet by extruding strips of a polymeric material such as polyvinyl chloride or foamed thermoplastic material onto the sheet. The hydrophilic properties of the sheet, also of consideration when the sheet is to be employed as a battery separator, may be improved by including wetting agents in the sheet that are known to the art, such as sodium alkylbenzenesulfonate, sodium lauryl sulfate, isooctyl-phenyl polyethoxyethanol, dioctylsulfosuccinate, etc.

The following non-limiting examples further illustrate the present invention.

EXAMPLE I 76.2 grams of a water soluble, uncured phenol formaldehyde resin (70% solids) are mixed with 4.5 grams of monoethanolamine and 4.5 grams of diethanolamine and the mixture heated for 40 minutes at 70° C. The resulting condensation product is allowed to cool to room temperature and 10.8 grams of silica and 16.8 grams of water are added. A mixture containing 4.9 grams of ethylene glycol, 16.2 grams of concentrated sulfuric acid and 9 grams of water is added to the cooled reaction product. The resulting mixture is poured onto a base mat of glass fibers which has been placed on a glass plate. A second glass plate is placed upon the poured mixture tightly to form a sandwich, and the sandwiched structure heated to about 70° C. for about 150 seconds to solidify the resinous product. The glass plates prevent evaporation of the entrapped aqueous material in the resin during the solidification. The solidified sheet having the base mat secured thereto is then removed from between the plates and dipped alternately into hot and then cold water several times. The washed sheet is then heated to about 100° C. to evaporate the volatile material trapped therein. The sheet is then cured by heating it to about 200° C. to give the finished microporous material.

EXAMPLE II

Several phenol/formaldehyde/monoethanolamine condensation pre-products were prepared as in Example I except that the reactants were heated to 80° C. for 20 minutes. The amount of amine in each product was varied as shown in Table I. Each of the products was diluted with amounts of water which varied in each case and then to each of the diluted products was added a curing mixture containing sulfuric acid, ethylene glycol and water, all as shown in Table I. Upon addition of the curing mixture in each case, the resinous pre-product was observed for separation into two separate phases, resinous and aqueous. The observations are reported in Table I. The results using the phenol/formaldehyde resin alone with no interacted amine as the starting material are reported for comparison in the table also.

TABLE I

| Phenol formaldehyde resin (grams) | Monoethanolamine (grams) | Water added after reaction | Accelerator, ethylene (conc.) glycol $H_2SO_4$ $H_2O$ (milliliters) | | | Observation |
|---|---|---|---|---|---|---|
| 12.7 | 1.0 | 1 | 0.7 | 1.5 | 1.5 | Not separated. |
| 12.7 | 1.0 | 2 | 0.7 | 1.5 | 1.5 | Do. |
| 12.7 | 1.0 | 3 | 0.7 | 1.5 | 1.5 | Slightly separated. |
| 12.7 | 1.5 | 1.5 | 1.14 | 2.43 | 2.43 | Not separated. |
| 12.7 | 1.5 | 2.5 | 1.14 | 2.43 | 2.43 | Do. |
| 12.7 | 1.5 | 3.5 | 1.14 | 2.43 | 2.43 | Do. |
| 12.7 | 1.5 | 4.5 | 1.14 | 2.43 | 2.43 | Do. |
| 12.7 | 0 | ---------- | 0.7 | 1.5 | 1.5 | Separated. |

It is claimed:

1. The method of preparing a microporous sheet which comprises condensing a mixture of phenol formaldehyde resin and an amount of an amine containing at least one pendant amino-hydrogen sufficient to provide substantial stability against phase separation when said phenol formaldehyde and amine are diluted with water and forming a resinous pre-product, diluting said resinous preproduct with water, adding an acid accelerator to the diluted pre-product and forming the pre-product into a sheet, solidifying the formed sheet under conditions which do not permit the loss of volatile materials in the sheet, removing said volatile materials after solidification and heating said sheet to a temperature between about 100 and 250° C. for a time sufficient to cure the sheet.

2. The process of claim 1 wherein said amine is an alkanolamine.

3. The process of claim 1 wherein said amine comprises a mixture of monoethanolamine and diethanolamine.

4. The process of claim 1 wherein the amine is present in said mixture in an amount of about 1 to 50 percent by weight, based on the weight of said phenol formaldehyde.

5. The process of claim 1 wherein the amount of water added to the resinous pre-product is up to about 70 percent, based on the weight of said pre-product.

6. The method of preparing a microporous sheet which comprises condensing a mixture of phenol formaldehyde resin and from about 1 to 50 percent by weight based on said resin of an amine containing at least one pendant amino-hydrogen to form a resinous pre-product, diluting said resinous pre-product with water in an amount that is less than the amount that would result in deleterious phase separation up to about 70 percent by weight based on the weight of said pre-product, adding an acid accelerator to the diluted mixture and forming the diluted preproduct into a sheet, heating the formed sheet under conditions which do not permit the loss of volatiles to solidify the sheet, evaporating volatiles from the solidified sheet and thereafter heating the sheet to a temperature between about 100 and 250° C. for a time sufficient to cure the sheet.

7. The method of claim 6 wherein said amine is an alkanolamine or mixture thereof.

8. The method of claim 7 wherein said amine is present in an amount ranging between about 5 and 25 percent by weight based on said phenol formaldehyde resin.

9. The method of claim 6 wherein inert filler is incorporated in said sheet prior to said heating to solidify the sheet in an amount of up to about 200 weight percent, based on the weight of said pre-product.

10. The method of claim 6 wherein inert fibers are incorporated in said sheet prior to said heating to solidify the sheet in an amount of up to about 25 weight percent, based on the weight of said pre-product.

References Cited
UNITED STATES PATENTS

| | | | |
|---|---|---|---|
| 2,514,415 | 7/1950 | Rasch | 136—146 |
| 3,436,373 | 4/1969 | Cox | 260—2.5 F |
| 3,475,355 | 10/1969 | Decker | 136—146 |

ALLEN B. CURTIS, Primary Examiner

H. A. FEELEY, Assistant Examiner

U.S. Cl. X.R.

260—51.5; 136—146, 148